US012424146B2

(12) United States Patent
Park et al.

(10) Patent No.: US 12,424,146 B2
(45) Date of Patent: Sep. 23, 2025

(54) PIXEL AND DISPLAY DEVICE HAVING THE SAME

(71) Applicant: Samsung Display Co., LTD., Yongin-si (KR)

(72) Inventors: Jun Hyun Park, Yongin-si (KR); Jang Mi Kang, Yongin-si (KR); Min Jae Jeong, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/372,466

(22) Filed: Sep. 25, 2023

(65) Prior Publication Data

US 2024/0013711 A1 Jan. 11, 2024

Related U.S. Application Data

(63) Continuation of application No. 18/103,356, filed on Jan. 30, 2023, now Pat. No. 11,769,449, which is a (Continued)

(30) Foreign Application Priority Data

May 14, 2021 (KR) ........................ 10-2021-0062986

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); (Continued)

(58) Field of Classification Search
CPC ............. G09G 3/32; G09G 2300/0842; G09G 2310/0267; G09G 2310/061; G09G 2320/0257
See application file for complete search history.

(56) References Cited

U.S. PATENT DOCUMENTS 10,229,637 B2 3/2019 Ka et al.
10,789,890 B2 * 9/2020 Kang .................. G09G 3/3233
(Continued)

FOREIGN PATENT DOCUMENTS

KR 10-0811332 3/2008
KR 1020170136128 A 12/2017
(Continued)

OTHER PUBLICATIONS

Non-Final Office Action dated Jun. 17, 2022, issued to U.S. Appl. No. 17/575,733 (submitted in parent).
(Continued)

*Primary Examiner* — Andrew Sasinowski
(74) *Attorney, Agent, or Firm* — CANTOR COLBURN LLP

(57) ABSTRACT

A pixel may include: a light emitting element; a first transistor connected between a first node electrically connected to a first driving power source and a second node electrically connected to an anode electrode of the light emitting element, the first transistor to control a driving current; a second transistor connected between a data line and the first node; a third transistor connected between the second node and a third node connected to a gate of the first transistor; a fourth transistor connected between the third node and a first initialization power source; a fifth transistor connected between a second initialization power source and the anode electrode of the light emitting element, the fifth transistor being turned on by a scan signal provided to a scan line; and a boosting capacitor connected between the scan line and the third node.

15 Claims, 11 Drawing Sheets

Related U.S. Application Data continuation of application No. 17/575,733, filed on Jan. 14, 2022, now Pat. No. 11,568,801.

(52) U.S. Cl.
CPC ................. *G09G 2310/061* (2013.01); *G09G 2320/0257* (2013.01)

(56) References Cited

U.S. PATENT DOCUMENTS

| | | | | |
|---|---|---|---|---|
| 10,984,718 | B2 | 4/2021 | Baik et al. | |
| 11,769,449 | B2 * | 9/2023 | Park | G09G 3/32 345/55 |
| 2009/0201230 | A1 | 8/2009 | Smith | |
| 2018/0005601 | A1 | 1/2018 | Kim et al. | |
| 2019/0096336 | A1 | 3/2019 | Lee | |
| 2020/0265776 | A1 | 8/2020 | Song et al. | |
| 2021/0027719 | A1 | 1/2021 | Cho et al. | |
| 2021/0091272 | A1 | 3/2021 | Bae et al. | |
| 2021/0111323 | A1 | 4/2021 | Kim et al. | |
| 2021/0327368 | A1 * | 10/2021 | Park | G09G 3/3233 |
| 2022/0198995 | A1 | 6/2022 | Ahmed | |

FOREIGN PATENT DOCUMENTS

| | | |
|---|---|---|
| KR | 10-2020-0005695 | 1/2020 |
| KR | 10-2020-0034086 | 3/2020 |
| KR | 1020200047848 A | 5/2020 |

OTHER PUBLICATIONS

Notice of Allowance dated Sep. 28, 2022,i ssued to U.S. Appl. No. 17/575,733 (submitted in parent).

Notice of Allowance dated May 24, 2023 issued to U.S. Appl. No. 18/103,356.

* cited by examiner

PIXEL AND DISPLAY DEVICE HAVING THE SAME

CROSS-REFERENCE TO RELATED APPLICATIONS

This application is a Continuation of U.S. patent application Ser. No. 18/103,356, filed on Jan. 30, 2023, which is a Continuation of U.S. patent application Ser. No. 17/575,733, filed on Jan. 14, 2022, now U.S. Pat. No. 11,568,801, which claims priority from and the benefit of Korean Patent Application No. 10-2021-0062986, filed on May 14, 2021, which is hereby incorporated by reference for all purposes as if fully set forth herein.

BACKGROUND

Field

Embodiments of the invention relate generally to a pixel and a display device having the pixel and more specifically, to a pixel having a boosting capacitor and a display device having the pixel.

Discussion of the Background

A display device includes a display panel including a plurality of pixels and a driver for driving the display panel. The driver controls the display panel to display an image by using an image signal applied from an external graphic processor. The graphic processor generates an image signal by rendering original data, and the rendering time, for which an image signal corresponding to one frame is generated, may vary according to the pattern or characteristic of an image. The driver may vary a driving frequency (e.g., frame frequency), according to the rendering time.

A pixel may include a pixel circuit having a plurality of transistors and a plurality of capacitors, and a light emitting element. When a scan signal is supplied from a scan line, the pixel circuit may be supplied with a data voltage from a data line, and supply, to the light emitting element, a current of a driving transistor corresponding to the data voltage. The light emitting element may emit light with an intensity corresponding to the current of the driving transistor.

When the display device is driven at a low driving frequency, one frame may include an active period in which a data signal is written and a blank period in which the data signal is not written. In the display device, a luminance difference may occur between the active period and the blank period due to a leakage current of the driving transistor and/or hysteresis characteristics of the driving transistor during the blank period. In order to solve the problem, the display device may supply an on-bias voltage plural times to the driving transistor in each of the active period and the blank period.

A display device for displaying high resolution images may supply a data voltage and a bias voltage through one data line so as to decrease the number of lines. Among a plurality of pixels connected to the same data line in the active period, a time at which a bias voltage is applied to pixels disposed at an upper portion with respect to the middle of a display panel and a time at which data is written in pixels disposed at a lower portion with respect to the middle of the display panel may overlap each other. Therefore, a distortion phenomenon may occur, in which a pattern displayed at a lower portion of the display panel is displayed as an afterimage at an upper portion of the display panel.

The above information disclosed in this Background section is only for understanding of the background of the inventive concepts, and, therefore, it may contain information that does not constitute prior art.

SUMMARY

Display devices having a pixel constructed according to the principles and embodiments of the invention are capable of preventing or minimizing ghost phenomenon when a bias voltage is applied to a driving transistor, thereby improving display quality. For example, the pixel of the display devices includes a boosting capacitor connected to a gate electrode of the driving transistor of the pixel and a gate electrode of an initialization transistor for initializing an anode of a light emitting element of the pixel. The boosting capacitor of the pixel may prevent or minimize the ghost phenomenon on the display devices when the bias voltage is applied to the driving transistor, thereby improving the display quality of the display devices.

Additional features of the inventive concepts will be set forth in the description which follows, and in part will be apparent from the description, or may be learned by practice of the inventive concepts.

According to an aspect of the invention, a pixel including: a light emitting element; a first transistor connected between a first node electrically connected to a first driving power source and a second node electrically connected to an anode electrode of the light emitting element, the first transistor to control a driving current; a second transistor connected between a data line and the first node, the second transistor to be turned on by a first scan signal applied through a first scan line; a third transistor connected between the second node and a third node connected to a gate of the first transistor, the third transistor to be turned on by a second scan signal applied through a second scan line; a fourth transistor connected between the third node and a first initialization power source, the fourth transistor to be turned on by a third scan signal applied through a third scan line; a fifth transistor connected between a second initialization power source and the anode electrode of the light emitting element, the fifth transistor to be turned on by a fourth scan signal applied through a fourth scan line; a storage capacitor connected between the first driving power source and the third node; and a boosting capacitor connected between the fourth scan line and the third node.

The pixel may further include: a sixth transistor connected between the first driving power source and the first node, the sixth transistor to be controlled by an emission control signal applied through an emission control line; and a seventh transistor connected between the second node and the anode electrode of the light emitting element, the seventh transistor to be controlled by the emission control signal.

Each of the first, second, fifth, sixth, and seventh transistors may be a P-type Low Temperature Poly-Silicon (LTPS) thin film transistor, and each of the third and fourth transistors may be an N-type oxide semiconductor thin film transistor.

The pixel may be to receive, plural times, the first scan signal during one frame period. The one frame period may include an active period in which a data voltage is applied to the pixel and a blank period in which the data voltage is not applied to the pixel.

The data line may be to provide the data voltage during the active period, and to provide a bias voltage during the blank period.

The emission control signal may be provided twice in each of the active period and the blank period.

When a first emission control signal is provided in the active period, each of the first, second, third, and fourth scan signals may be provided once. When a second emission control signal is provided in the active period, only the fourth scan signal may be provided once.

When the first emission control signal is provided in the active period, the first scan signal, the second scan signal, and the fourth scan signal may be provided to overlap each other.

When the first emission control signal is provided in the active period, the third scan signal may be provided not to overlap the first scan signal, the second scan signal, and the fourth scan signal.

When a first emission control signal is provided in the blank period, each of the first scan signal and the fourth scan signal may be provided once such that the first scan signal and the fourth scan signal overlap each other. When a second emission control signal is provided in the blank period, the fourth scan signal may be provided once.

When a first emission control signal and a second emission control signal are provided in the blank period, each of the first scan signal and the fourth scan signal may be provided once such that the first scan signal and the fourth scan signal overlap each other.

According to another aspect of the invention, a display device including: a display panel including a first pixel disposed at a lower portion and a second pixel disposed at an upper portion, wherein the first pixel and the second pixel are connected to a same data line, the first pixel is connected to a (1-1)th scan line, and the second pixel is connected to a (1-2)th scan line; a scan driver configured to provide, plural times, a (1-1)th scan signal to the (1-1)th scan line and provide, plural times, a (1-2)th scan signal to the (1-2)th scan line during one frame period; a data driver configured to provide a data voltage to data lines; and a timing controller configured to control the scan driver and the data driver.

The one frame period may include an active period in which the data voltage is applied to the first pixel and the second pixel and a blank period in which the data voltage is not applied to the first pixel and the second pixel. In the active period, the scan driver may be to provide, once, the (1-1)th scan signal to the first pixel and to provide, once, the (1-2)th scan signal to the second pixel. In the active period, the timing controller may be to control the scan driver and the data driver such that the data voltage is applied to the first pixel and is not applied to the second pixel, when a first (1-1)th scan signal is provided to the first pixel.

The data line may be to provide the data voltage during the active period, and to provide a bias voltage during the blank period.

The first pixel may include: a first light emitting element; a (1-1)th transistor connected between a (1-1)th node electrically connected to a first driving power source and a (2-1)th node electrically connected to an anode electrode of the first light emitting element, the (1-1)th transistor to control a driving current; a (2-1)th transistor connected between the data line and the (1-1)th node, the (2-1)th transistor to be turned on by the (1-1)th scan signal applied through the (1-1)th scan line; a (3-1)th transistor connected between the (2-1)th node and a (3-1)th node connected to a gate electrode of the (1-1)th transistor, the (3-1)th transistor to be turned on by a (2-1)th scan signal applied through a (2-1)th scan line; a (4-1)th transistor connected between the (3-1)th node and a first initialization power source, the (4-1)th transistor to be turned on by a (3-1)th scan signal applied through a (3-1)th scan line; a (7-1)th transistor connected between a second initialization power source and the anode electrode of the first light emitting element, the (7-1)th transistor to be turned on by a (4-1)th scan signal applied through a (4-1)th scan line; a first storage capacitor connected between the first driving power source and the (3-1)th node; and a first boosting capacitor connected between the (4-1)th scan line and the (3-1)th node.

The first pixel may be further connected to a (1-1)th emission control line. The display device may further include an emission driver configured to provide a (1-1)th emission control signal to the (1-1)th emission control line. The e first pixel may further include: a (5-1)th transistor connected between the first driving power source and the (1-1)th node, the (5-1)th transistor to be turned on by the (1-1)th emission control signal applied through the (1-1)th emission control line; and a (6-1)th transistor connected between the (2-1)th node and the anode electrode of the first light emitting element, the (6-1)th transistor to be turned on by the (1-1)th emission control signal.

The emission driver may provide, twice, the (1-1)th emission control signal in each of the active period and the blank period.

The scan driver may be to provide, once, each of the (1-1)th to (4-1)th scan signals when a first (1-1)th emission control signal is provided in the active period, and to provide, once, the (4-1)th scan signal when a second (1-1)th emission control signal is provided in the active period.

The scan driver may be to provide the (1-1)th scan signal, the (2-1)th scan signal, and the (4-1)th scan signal to overlap each other, when the first (1-1)th emission control signal is provided in the active period.

The scan driver may be to provide the (3-1)th scan signal not to overlap the (1-1)th scan signal, the (2-1)th scan signal, and the (4-1)th scan signal, when the first (1-1)th emission control signal is provided in the active period.

The second pixel may include: a second light emitting element; a (1-2)th transistor connected between a (1-2)th node electrically connected to the first driving power source and a (2-2)th node electrically connected to an anode electrode of the second light emitting element, the (1-2)th transistor; a (2-2)th transistor connected between the same data line and the (1-2)th node, the (2-2)th transistor to be turned on by the (1-2)th scan signal applied through the (1-2)th scan line; a (3-2)th transistor connected between the (2-2)th node and (3-2)th node connected to a gate electrode of the (1-2)th transistor, the (3-2)th transistor to be turned on by a (2-2)th scan signal applied through a (2-2)th scan line; a (4-2)th transistor connected between the (3-2)th node and the first initialization power source, the (4-2)th transistor to be turned on by a (3-2)th scan signal applied through a (3-2)th scan line; a (7-2)th transistor connected between the second initialization power source and the anode electrode of the second light emitting element, the (7-2)th transistor to be turned on by a (4-2)th scan signal applied through a (4-2)th scan line; a second storage capacitor connected between the first driving power source and the (3-2)th node; and a second boosting capacitor connected between the (4-2)th scan line and the (3-2)th node.

In the active period, the timing controller may control the driving of the scan driver and the data driver such that the (4-1)th scan signal is provided to the first pixel and the (4-2)th scan signal is provided to the second pixel, when the first (1-1)th scan signal is provided to the first pixel.

According to another aspect of the invention, a pixel includes: a light emitting element to emit light according to a driving current; a driving transistor to control an amount of the driving current according to a data voltage supplied through a data line; a data input transistor connected to a source electrode of the driving transistor and the data line, the data input transistor to supply the data voltage to the source electrode of the driving transistor in an active period and to supply a bias voltage to the source electrode of the driving transistor in a blank period; a first initialization transistor connected to a gate electrode of the driving transistor, the first initialization transistor to initialize the gate electrode of the driving transistor with a first initialization voltage; a second initialization transistor connected to an anode of the light emitting element, the second initialization transistor to initialize the anode of the light emitting element with a second initialization voltage; a storage capacitor connected to the gate electrode of the driving transistor, the storage capacitor to store the data voltage supplied through the data input transistor; and a boosting capacitor comprising a first terminal connected to the gate electrode of the driving transistor and a second terminal connected to a gate electrode of the second initialization transistor, the boosting capacitor to change a voltage of the gate electrode of the driving transistor by a capacitive coupling effect.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
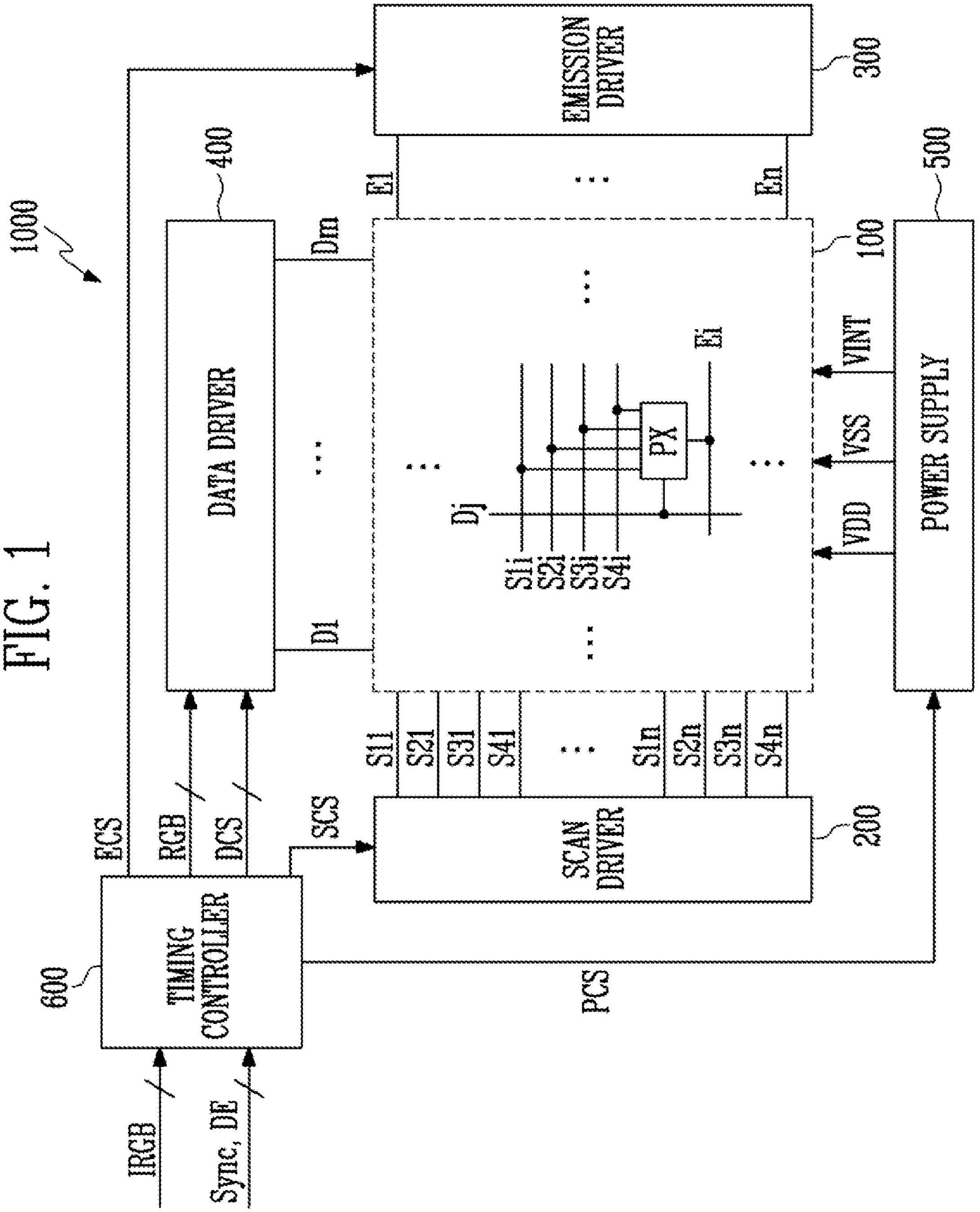
FIG. 1 is a bock diagram illustrating an embodiment of a display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as “beneath,” “below,” “under,” “lower,” “above,” “upper,” “over,” “higher,” “side” (e.g., as in “sidewall”), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as “below” or “beneath” other elements or features would then be oriented “above” the other elements or features. Thus, the term “below” can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, “a,” “an,” and “the” are intended to include the plural forms as well, unless the context clearly indicates otherwise. Moreover, the terms “comprises,” “comprising,” “includes,” and/or “including,” when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms “substantially,” “about,” and other similar terms, are used as terms of approximation and not as terms of degree, and, as such, are utilized to account for inherent deviations in measured, calculated, and/or provided values that would be recognized by one of ordinary skill in the art.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the invention will be described in more detail with reference to the accompanying drawings.

FIG. 1 is a bock diagram illustrating a display device in accordance with embodiments of the present disclosure.

Referring to FIG. 1, the display device 1000 may include a display panel 100, a scan driver 200, an emission driver 300, a data driver 400, a power supply 500, and a timing controller 600.

The display device 1000 may display an image at various frame frequencies (e.g., refresh rates, driving frequencies, or screen refresh rates) according to driving conditions. The frame frequency may be the number of writing operations, in which a data voltage is substantially written to a driving transistor of a pixel PX, for one second. For example, the frame frequency is also referred to as a screen scan rate or a screen refresh frequency, and represents a frequency at which a display screen is refreshed for one second.

In an embodiment, an output frequency of a first scan signal supplied to a first scan line S1i may be changed according to a frame frequency so as to supply an output frequency and/or a data signal (e.g., data voltage) of the data driver 400.

In an embodiment, the display device 1000 may adjust an output frequency of the scan driver 200, an output frequency of the emission driver 300, and an output frequency of the data driver 400 according to driving conditions. For example, the display device 1000 may display an image, corresponding to various frame frequencies of 1 Hz to 120 Hz. However, this is merely illustrative, and the display device 1000 may also display an image at a frame frequency of 120 Hz or higher (e.g., 240 Hz or 480 Hz).

For example, the display device 1000 may operate at various frame frequencies. In the case of a low frequency driving operation, an image defect such as flicker may be viewed or caused due to current leakage in a pixel. In addition, an afterimage such as image attraction may be viewed or occurred when a response speed is changed due to a change in bias state of a driving transistor, which is caused by driving at various frame frequencies, and/or a shift or degradation in a threshold voltage of the driving transistor according to a change in hysteresis characteristic, etc.

In order to improve image quality, one frame period of the display device 1000 may include one active period and at least one blank period according to the frame frequency. The active period includes a period in which a data signal corresponding to an output image is written, but the blank period does not include the period in which the data signal corresponding to the output image is written. Operations of the active period and the blank period will be described in detail with reference to FIGS. 4, 5A, 5B, and 5C.

The display panel 100 may include scan lines S11 to S1n, S21 to S2n, S31 to S3n, and S41 to S4n, emission control lines E1 to En, and data lines D1 to Dm, and include pixels PX connected to the scan lines S11 to S1n, S21 to S2n, S31 to S3n, and S41 to S4n, the emission control lines E1 to En, and the data lines D1 to Dm, wherein m and n are integers greater than 1. Each of the pixels PX may include a driving transistor and a plurality of switching transistors. The pixels PX may be supplied with a first driving power source VDD, a second driving power source VSS, and an initialization power source VINT from the power supply 500. Each of the pixels PX may be supplied with a data signal (e.g., data voltage) or a bias voltage through a corresponding data line among the data lines D1 to Dm. In accordance with an embodiment, the pixel PX may be supplied with the data signal (e.g., data voltage) through the corresponding data line among the data lines D1 to Dm in the active period, and may be supplied with the bias voltage through the corresponding data line among the data lines D1 to Dm in the blank period.

In an embodiment, signal lines connected to the pixel PX may be variously implemented according to a circuit structure of the pixel PX.

The timing controller 600 may be supplied with input image data IRGB and control signals Sync and DE from a host system such as an Application Processor (AP) through a predetermined interface.

The timing controller 600 may generate a first control signal SCS, a second control signal ECS, a third control signal DCS, and a fourth control signal PCS, based on the input image data IRGB, a synchronization signal Sync (e.g., a vertical synchronization signal, a horizontal synchronization signal, etc.), a data enable signal DE, a clock signal, and the like. The first control signal SCS may be supplied to the scan driver 200, the second control signal ECS may be supplied to the emission driver 300, the third control signal DCS may be supplied to the data driver 400, and the fourth control signal PCS may be supplied to the power supply 500. The timing controller 600 may realign the input image data IRGB and supply the realigned image data to the data driver 400. The timing controller 600 may control a data signal to be supplied to the data lines D1 to Dm in the active period, and control a bias voltage to be supplied to the data lines D1 to Dm in the blank period.

The scan driver 200 may receive the first control signal SCS from the timing controller 600, and supply a first scan signal, a second scan signal, a third scan signal, and a fourth scan signal, respectively, to first scan lines S11 to S1n, second scan lines S21 to S2n, third scan lines S31 to S3n, and fourth scan lines S41 to S4n, based on the first control signal SCS.

The first, second, third, and fourth scan signals may be set to have a gate-on voltage (e.g., a low voltage) corresponding to a type of transistors to which the corresponding scan signals are supplied. A transistor for receiving a scan signal may be set to have a turn-on state when the scan signal is supplied. For example, the gate-on voltage of a scan signal supplied to a P-channel metal oxide semiconductor (PMOS) transistor may have a logical low level, and the gate-on voltage of a scan signal supplied to an N-channel metal oxide semiconductor (NMOS) transistor may have a logical high level. Hereinafter, it will be understood that the term "that a scan signal is supplied" means that the scan signal is supplied with a logic level at which a transistor controlled by the scan signal is turned on.

The emission driver 300 may supply an emission control signal to the emission control lines E1 to En, based on the second control signal ECS. For example, the emission control signal may be sequentially supplied to the emission control lines E1 to En.

The emission control signal may be set to have a gate-off voltage (e.g., a high voltage). A transistor for receiving the emission control signal may be turned off when the emission control signal is supplied, and be set to have the turn-on state in other cases. Hereinafter, it will be understood that the expression "that the emission control signal is supplied" means that the emission control signal is supplied with a logic level at which a transistor controlled by the emission control signal is turned off.

For convenience of description, a case where each of the scan driver 200 and the emission driver 300 is a single component has been illustrated in FIG. 1. However, embodiments are not limited thereto. The scan driver 200 may include a plurality of scan drivers. For example, each scan driver may supply at least one of the first, second, third, and fourth scan signals according to a design. In addition, at least portions of the scan driver 200 and the emission driver 300 may be integrated as one driving circuit, one module, or the like.

The data driver 400 may receive the third control signal DCS and image data RGB from the timing controller 600. The data driver 400 may convert the image data RGB in a digital form into an analog data signal (e.g., data voltage).

The data driver 400 may supply a data signal (e.g., data voltage) or a bias voltage to the data lines D1 to Dm, corresponding to the third control signal DCS. The data signal (e.g., data voltage) or the bias voltage, which is supplied to the data lines D1 to Dm, may be supplied to be synchronized with the first scan signal supplied to the first scan lines S11 to S1n. The bias voltage may be a voltage for forming a bias state at a source electrode and/or a drain electrode of the driving transistor included in the pixel PX. The bias voltage may be a positive voltage. However, the level of the bias voltage is not limited thereto, and the bias voltage may be a negative voltage.

The power supply 500 may supply, to the display panel 100, a voltage of the first driving power source VDD for driving the pixel PX and a voltage of the second driving power source VSS. A voltage level of the second driving power source VSS may be lower than that of the first driving power source VDD. For example, the voltage of the first driving power source VDD may be a positive voltage, and the voltage of the second driving power source VSS may be a negative voltage.

Figure 3:
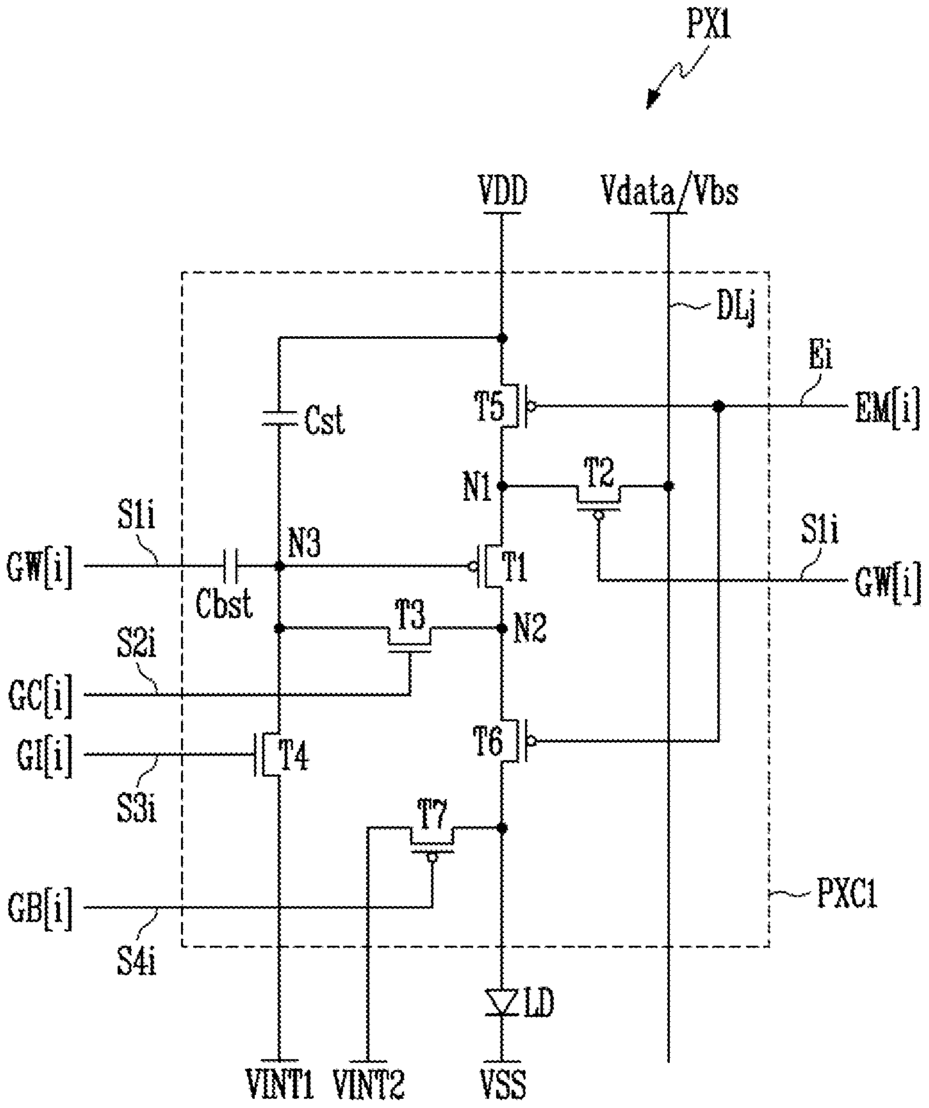
FIG. 3 is a circuit diagram illustrating an embodiment of a pixel included in the display device of FIG. 1.

The power supply 500 may supply a voltage of the initialization power source VINT to the display panel 100. The initialization power source VINT may include initialization power sources (e.g., VINT1 and VINT2, which are shown in FIG. 3) that have with different voltage levels. The initialization power source VINT may be a power source for initializing the pixel PX. For example, the driving transistor and/or a light emitting element, included in the pixel PX, may be initialized by the voltage of the initialization power source VINT. The voltage of the initialization power source VINT may be a negative voltage.

Figure 2:
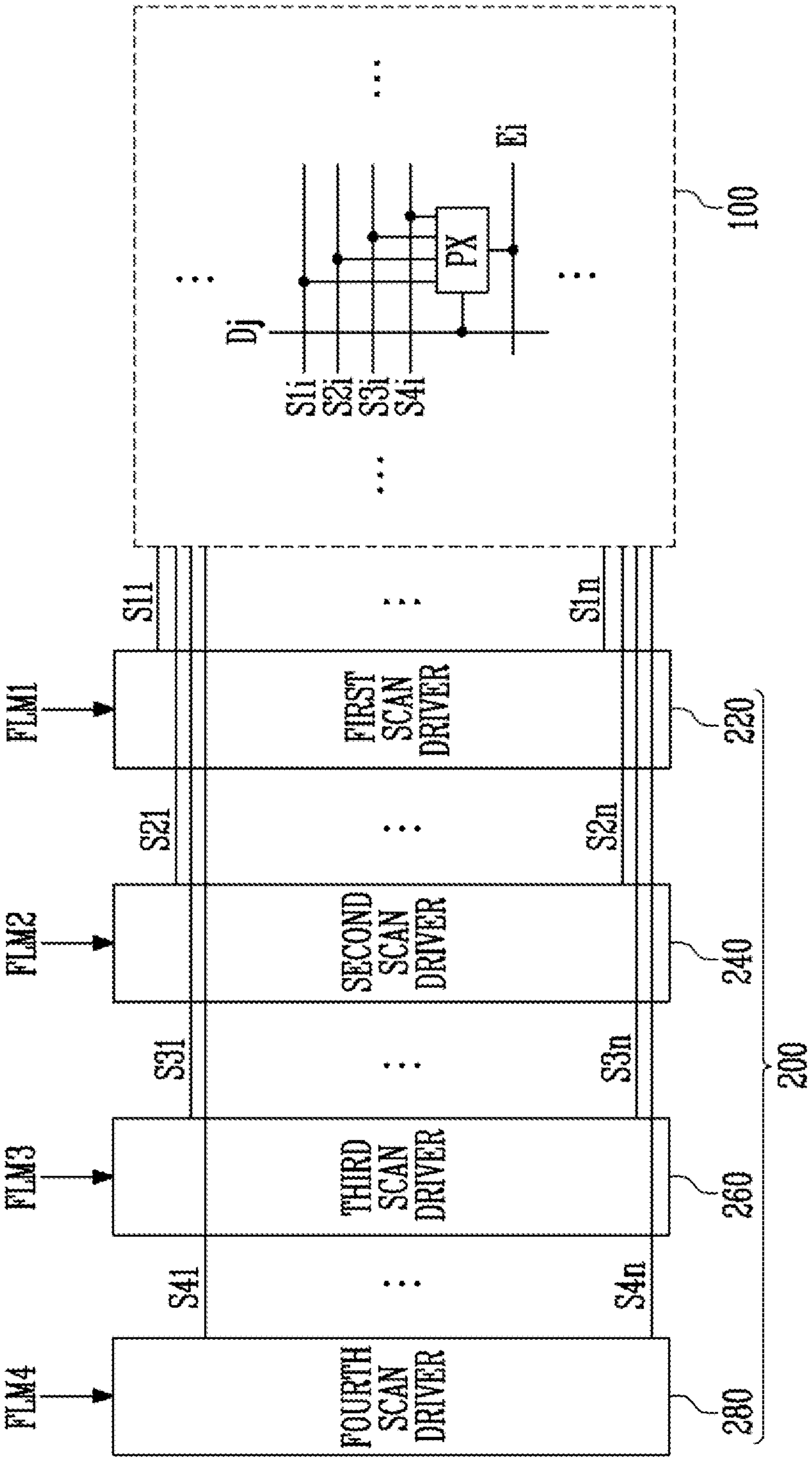
FIG. 2 is a diagram illustrating an embodiment of a scan driver included in the display device of FIG. 1.

FIG. 2 is a diagram illustrating an example of the scan driver included in the display device shown in FIG. 1.

Referring to FIGS. 1 and 2, the scan driver 200 may include a first scan driver 220, a second scan driver 240, a third scan driver 260, and a fourth scan driver 280.

The first control signal SCS may include first, second, third, and fourth scan start signals FLM1, FLM2, FLM3, and FLM4. The first, second, third, and fourth scan start signals FLM1, FLM2, FLM3, and FLM4 may be respectively supplied to the first, second, third, and fourth scan drivers 220, 240, 260, and 280.

A width, a supply timing, and the like of each of the first, second, third, and fourth scan start signals FLM1, FLM2, FLM3, and FLM4 may be determined according to a driving condition of the pixel PX and a frame frequency. The first, second, third, and fourth scan signals may be respectively output based on the first, second, third, and fourth scan start signals FLM1, FLM2, FLM3, and FLM4. For example, a width of at least one signal among the first, second, third, and fourth scan signals may be different from that of the other signals.

The first scan driver 220 may sequentially supply the first scan signal to the first scan lines S11 to S1n in response to the first scan start signal FLM1. The second scan driver 240 may sequentially supply the second scan signal to the second scan lines S21 to S2n in response to the second scan start signal FLM2. The third scan driver 260 may sequentially supply the third scan signal to the third scan lines S31 to S3n in response to the third scan start signal FLM3. The fourth scan driver 280 may sequentially supply the fourth scan signal to the fourth scan lines S41 to S4n in response to the fourth scan start signal FLM4.

FIG. 3 is a circuit diagram illustrating an example of the pixel included in the display device shown in FIG. 1. A pixel PX1 is a pixel disposed on an i-th row and a j-th column. Here, i and j are natural numbers.

Referring to FIGS. 1, 2, and 3, the pixel PX1 may include a light emitting element LD and a pixel circuit PXC1 connected to the light emitting element LD.

An anode electrode of the light emitting element LD may be connected to the pixel circuit PXC1, and a cathode electrode of the light emitting element LD may be connected to the second driving power source VSS. The light emitting element LD may generate light with a predetermined luminance corresponding to an amount of current supplied from the pixel circuit PXC1. In an embodiment, the light emitting element LD may be an organic light emitting diode including an organic emitting layer. In another embodiment, the light emitting element LD may be an inorganic light emitting element formed of an inorganic material. In still another embodiment, the light emitting element LD may be a light emitting element made of a combination of an organic material and an inorganic material. The light emitting element LD may have a form in which a plurality of inorganic light emitting elements are connected in parallel and/or series between the second driving power source VSS and a sixth transistor M6.

The pixel circuit PXC1 may control an amount of current flowing from the first driving power source VDD to the second driving power source VSS via the light emitting element LD, corresponding to a data voltage Vdata. To this end, the pixel circuit PXC1 may include first, second, third, fourth, fifth, sixth, and seventh transistors T1, T2, T3, T4, T5, T6, and T7, a storage capacitor Cst, and a boosting capacitor Cbst.

The first transistor T1 may be connected between a first node N1 electrically connected to the first driving power source VDD and a second node N2 electrically connected to the anode electrode of the light emitting element LD. The first transistor T1 may generate a driving current and provide the generated driving current to the light emitting element LD. A gate electrode of the first transistor T1 may be connected to a third node N3. The first transistor T1 may be a driving transistor of the pixel PX1.

The second transistor T2 in the form of a data input transistor may be connected between a j-th data line DLj and the first node N1. The second transistor T2 may include a gate electrode for receiving a first scan signal GW[i]. When the second transistor T2 is turned on in the active period, the data voltage Vdata may be supplied to the first node N1. When the second transistor T2 is turned on in the blank period, a bias voltage Vbs may be supplied to the first node N1.

The third transistor T3 may be connected between the second node N2 and the third node N3. The third transistor T3 may include a gate electrode for receiving a second scan signal GC[i]. The third transistor T3 may be turned on by the second scan signal GC[i], to electrically connect a second electrode of the first transistor T1 and the third node N3 to each other. Therefore, when the third transistor T3 is turned on, the first transistor T1 may be connected in a diode form. For example, the third transistor T3 may function to perform writing of the data voltage Vdata to the first transistor T1 and threshold voltage compensation.

The storage capacitor Cst may be connected between the first driving power source VDD and the third node N3. The storage capacitor Cst may store a voltage corresponding to the data voltage Vdata and a threshold voltage of the first transistor T1.

The boosting capacitor Cbst is used to improve a contrast ratio by compensating for a voltage drop due to a load in the display panel 100, and may be connected between a first scan line S1i and the third node N3. For example, the boosting capacitor Cbst may boost a voltage of the third node N3 by a capacitive coupling effect, when a voltage level of the first scan signal GW[i] supplied through the first scan line S1i is changed, particularly, at a time at which the supply of the first scan signal GW[i] is suspended, so that the voltage drop due to the load in the display panel 100 can be compensated. Thus, a phenomenon can be reduced, in which the contrast ratio is deteriorated as a gate voltage of the first transistor T1 does not sufficiently increase when a black grayscale is to be expressed.

The fourth transistor T4 in the form of a first initialization transistor may be connected between the third node N3 and a first initialization power source VINT1. The fourth transistor T4 may include a gate electrode for receiving a third scan signal GI[i]. In an embodiment, the third scan signal GI[i] may correspond to a second scan signal GC[i] of a previous pixel row. The fourth transistor T4 may be turned on when the third scan signal GI[i] is supplied, to supply a voltage of the first initialization power source VINT1 to the third node N3. Accordingly, the voltage of the third node N3, i.e. the gate voltage of the first transistor T1 may be initialized to the voltage of the first initialization power source VINT1. In an embodiment, the first initialization power source VINIT1 may be set to have a voltage lower than a lowest voltage of the data voltage Vdata.

The fifth transistor T5 may be connected between the first driving power source VDD and the first node N1. The fifth transistor T5 may include a gate electrode for receiving an emission control signal EM[i].

The sixth transistor T6 may be connected between the second node N2 and the anode electrode of the light emitting element LD. The sixth transistor T6 may include a gate electrode for receiving the emission control signal EM[i].

The fifth and sixth transistors T5 and T6 may be turned on in a gate-on period of the emission control signal EM[i], and be turned off in a gate-off period of the emission control signal EM[i].

The seventh transistor T7 in the form of a second initialization transistor may be connected between a second initialization power source VINT2 and the anode electrode of the light emitting element LD. The seventh transistor T7 may include a gate electrode for receiving a fourth scan signal GB[i].

The seventh transistor T7 may be turned on when the fourth scan signal GB[i] is supplied, to supply a voltage of the second initialization power source VINT2 to the anode electrode of the light emitting element LD.

In an embodiment, each of the first, second, fifth, sixth, and seventh transistors T1, T2, T5, T6, and T7 may be a P-type Low Temperature Poly-Silicon (LTPS) thin film transistor, and each of the third and fourth transistors T3 and T4 may be an N-type oxide semiconductor thin film transistor. As the N-type oxide semiconductor thin film transistor has a current leakage characteristic better than the P-type LTPS thin film transistor, the third and fourth transistors T3 and T4 as switching transistors may be formed as the N-type oxide semiconductor thin film transistors.

Accordingly, the leakage currents in the third and fourth transistors T3 and T4 are considerably decreased, and pixel driving and image display can be performed at a low frequency of less than 30 Hz. Thus, power consumption can be reduced in a low power driving mode.

For example, although a case where only the third and fourth transistors T3 and T4 are formed as the N-type oxide semiconductor thin film transistors has been illustrated in the above description, embodiments are not limited thereto.

Hereinafter, a driving method of the display device 1000 (see FIG. 1) including the pixel PX1 shown in FIG. 3 will be described in detail with reference to FIGS. 4, 5A, 5B, and 5C.

Figure 4:
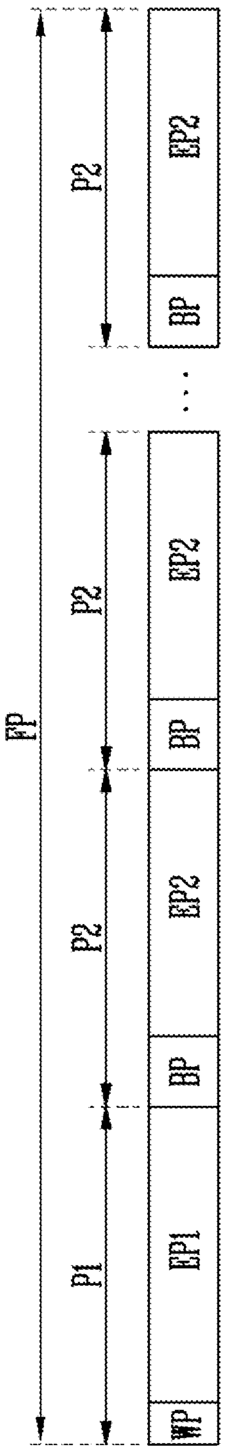
FIG. 4 is a diagram illustrating an embodiment of variable frequency driving operation of the display device of FIG. 1.
Figure 5A:
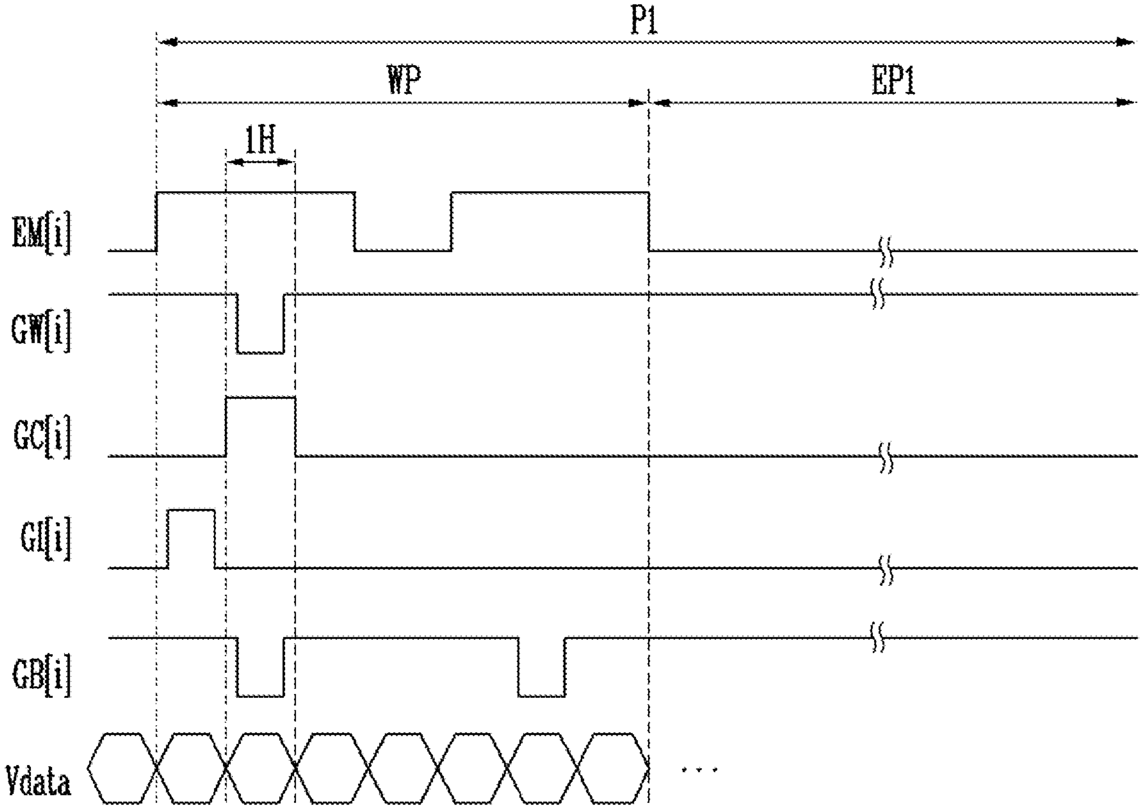
FIG. 5A is a waveform diagram illustrating an embodiment of an operation in an active period of the display device of FIG. 1.
Figure 5B:
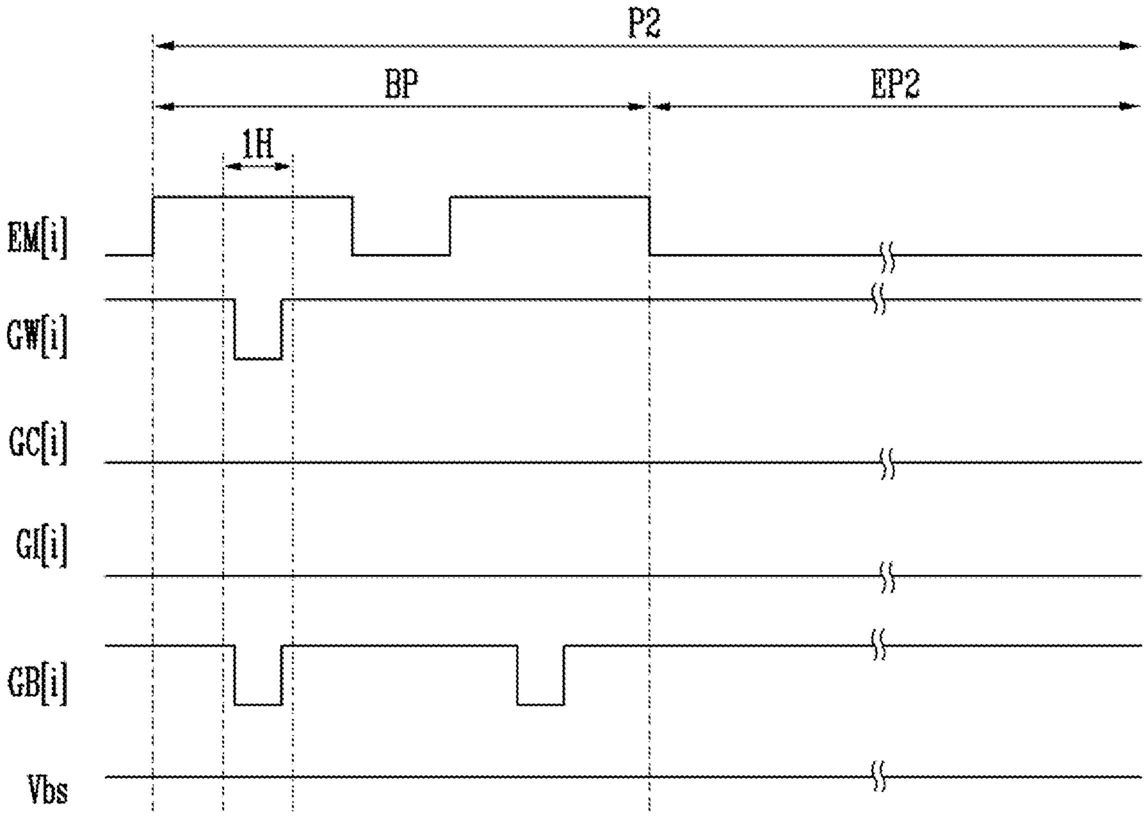
FIGS. 5B and 5C are waveform diagrams illustrating an embodiment of an operation in a blank period of the display device of FIG. 1.
Figure 5C:
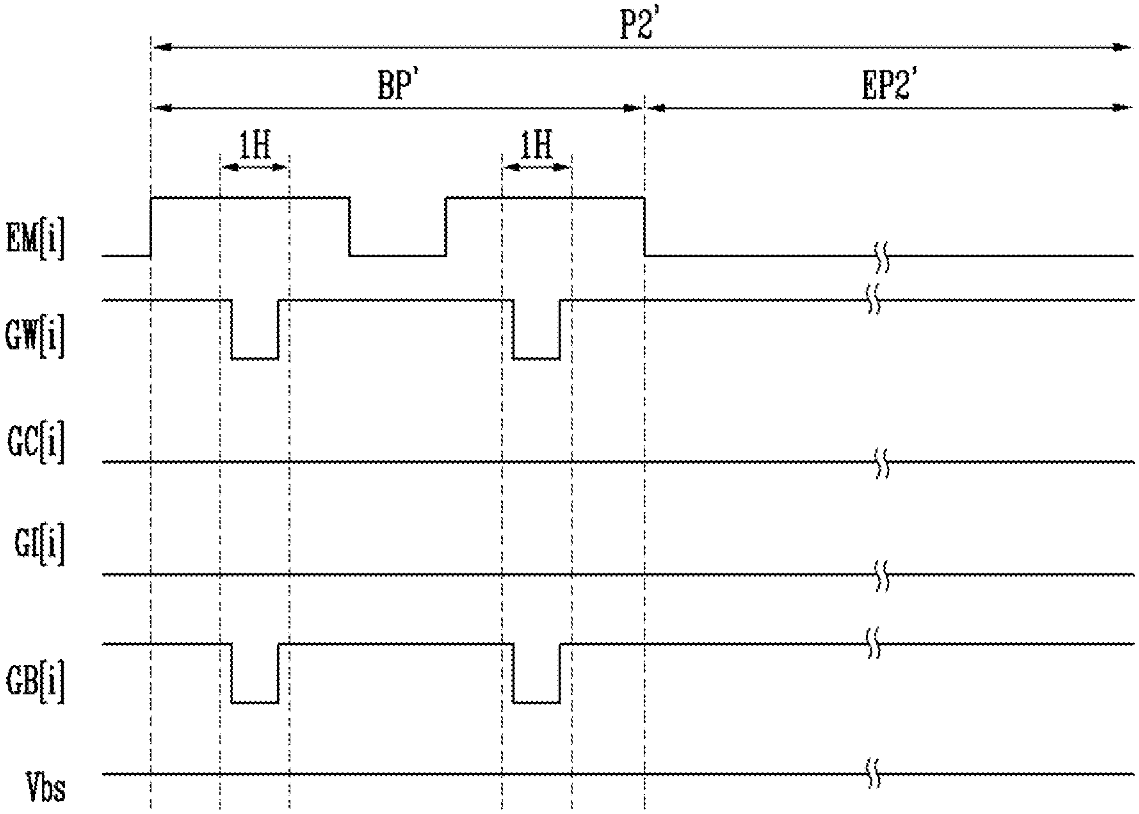

FIG. 4 is a diagram illustrating an embodiment of variable frequency driving operation of the display device shown in FIG. 1. FIG. 5A is a waveform diagram illustrating an embodiment of an operation in the active period of the display device shown in FIG. 1. FIGS. 5B and 5C are waveform diagrams illustrating an embodiment of an operation in the blank period of the display device shown in FIG. 1.

Referring to FIGS. 4, 5A, 5B, and 5C, in variable frequency driving operation in which a frame frequency is controlled, one frame period FP may include an active period P1 and a plurality of consecutive blank periods P2. The number of repetitions of the blank period P2 in the frame period FP (i.e., a number of the blank periods P2) may increase as the frame frequency becomes lowers.

The active period P1 may include a data writing period WP and a first emission period EP1. The blank period P2 may include a bias period BP and a second emission period EP2.

The data writing period WP may be a period in which the data voltage Vdata is stored in the storage capacitor Cst as the second and third transistors T2 and T3 are turned on. The bias period BP may be a period in which an on-bias state of the first transistor T1 is maintained without rewriting the data voltage Vdata, and only the second transistor T2 is turned on to supply a predetermined voltage to a source electrode of the first transistor T1. For example, the active period P1 may be a writing period, and the blank period P2 may be a holding period. Therefore, during substantially one frame period FP, the pixel PX1 may emit light with a grayscale corresponding to the data voltage Vdata written in the data writing period WP.

In an embodiment, the second scan signal GC[i] may be supplied only in the data writing period WP. The second scan signal GC[i] may be supplied to the second scan line S2i in the data writing period WP.

In an embodiment, the first scan signal GW[i] may be supplied in the data writing period WP and the bias period BP. The first scan signal GW[i] may be supplied to the first scan line S1i in the data writing period WP. Also, the first scan signal GW[i] may be supplied to the first scan line S1i in the bias period BP.

The first scan signal GW[i] may be a signal for controlling the first transistor T1 to have the on-bias state. For example, when the second transistor T2 is turned on by the first scan signal GW[i], a bias voltage (e.g., the data voltage Vdata and the bias voltage Vbs) may be applied to the first electrode (e.g., source electrode) of the first transistor T1. When the bias voltage is supplied to the source electrode of the first transistor T1, the first transistor T1 may become the on-bias state, and a threshold voltage characteristic of the first transistor T1 may be changed. Thus, the characteristic of the first transistor T1 is fixed to a specific state in low frequency driving operation, so that degradation of the first transistor T1 can be prevented.

In an embodiment, in the one frame period FP, voltage levels of bias voltages in the active period P1 and the blank period P2 may be different from each other. For example, the data voltage Vdata may be applied as a bias voltage in the active period P1, and the bias voltage Vbs may be applied as a bias voltage in the blank period P2.

As shown in FIGS. 5A and 5B, the first scan signal GW[i] may be supplied to the first scan line S1i in the data writing period WP of the active period P1 and the bias period BP of the blank period P2. Therefore, a bias voltage may be supplied to a first electrode of the first transistor T1 in the data writing period WP and the bias period BP. For example, the bias voltage may be periodically applied to the first transistor T1 regardless of the frame frequency. In addition, as shown in FIG. 5C, the first scan signal GW[i] may be supplied plural times to the first scan line S1i in the bias period BP for maintaining a stable on-bias state of the first transistor T1. Accordingly, in the low frequency driving operation, the variation of the driving current of the first transistor T1 in the frame period FP can be minimized, and a luminance change of the light emitting element LD in the frame period FP can be minimized.

Hereinafter, scan signals GW[i], GC[i], GI[i], and GB[i] supplied in the active period P1 and an operation of the pixel PX1 will be described in detail with reference to FIGS. 3, 4, and 5A. The pixel PX1 may be supplied, plural times, with the emission control signal EM[i] through the emission control line Ei during the data writing period WP. For example, the pixel PX1 may be supplied, twice, with the emission control signal EM[i] having a turn-off level during the data writing period WP.

In accordance with an embodiment, while a first emission control signal EM[i] in the active period P1 is provided, the first scan signal GW[i], the second scan signal GC[i], and the fourth scan signal GB[i] may be supplied to overlap each other after the third scan signal GI[i] is supplied.

First, when the third scan signal GI[i] is supplied in the active period P1, the fourth transistor T4 may be turned on such that the gate electrode of the first transistor T1 is initialized by the first initialization power source VINT1.

Subsequently, when the first scan signal GW[i] is supplied, the second transistor T2 may be turned on such that the data voltage Vdata from the data line DLj is supplied from the first electrode (e.g., source electrode) of the first transistor T1. The first transistor T1 may have the on-bias state, based on the first initialization power source VINT1 and the data voltage Vdata. For example, at the same time, the first scan signal GW[i] having a turn-on level is provided to one electrode of the boosting capacitor Cbst, and therefore, a voltage having a logical low level may be provided such that the on-bias state of the first transistor T1 is boosted or improved.

In addition, the data voltage Vdata may be supplied to the pixel PX1 in synchronization with the first scan signal GW[i] and the second scan signal GC[i], and be stored in the storage capacitor Cst. The pixel PX1 may emit light with a grayscale corresponding to the data voltage Vdata stored in the storage capacitor Cst during the first emission period EP1.

In addition, when the fourth scan signal GB[i] is supplied, the seventh transistor T7 may be turned on such that the voltage of the second initialization power source VINT2 is provided to the anode electrode of the light emitting element LD. Thus, a parasitic capacitance which may occur in the light emitting element LD is discharged, so that the display quality of a black grayscale can be improved.

Subsequently, while a second emission control signal EM[i] in the active period P1 is provided, only the fourth scan signal GB[i] may be supplied, and the other first, second, and third scan signals GW[i], GC[i], and GI[i] may not be supplied. When the fourth scan signal GB[i] is supplied, the seventh transistor T7 may be turned on such that the voltage of the second initialization power source VINT2 is provided to the anode electrode of the light emitting element LD.

For example, the blank period P2 shown in FIG. 5B may include a bias period BP and a second emission period EP2. The bias period BP may correspond to a non-emission period. During the bias period BP, the pixel PX1 may be supplied, plural times, with the emission control signal EM[i] through the emission control line Ei. For example, the pixel PX1 may be supplied, twice, with the emission control signal EM[i] having the turn-off level during the bias period BP.

In the bias period BP, only the first scan signal GW[i] and the fourth scan signal GB[i] may be supplied, and the second scan signal GC[i] and the third scan signal GI[i] may not be supplied. For example, the second scan signal GC[i] and the third scan signal GI[i] may have the logical low level.

While s first emission control signal EM[i] in the blank period P2 is provided, the bias voltage Vbs may be supplied to the data line DLj. The voltage level of the bias voltage Vbs may be determined to maintain an on-bias state of the first transistor T1. For example, when the first scan signal GW[i] is supplied, the bias voltage Vbs may be supplied to the source electrode of the first transistor T1 (i.e., the first node N1). In accordance with an embodiment, the bias voltage Vbs may be a voltage corresponding to the black grayscale. For example, the bias voltage Vbs may be a level of about 5V to about 7V.

In addition, when the fourth scan signal GB[i] is supplied, the seventh transistor T7 may be turned on such that the voltage of the second initialization power source VINT2 is provided to the anode electrode of the light emitting element LD. Thus, a parasitic capacitance which may occur in the light emitting element LD is discharged, so that the display quality of the black grayscale can be improved.

In addition, while a second emission control signal EM[i] in the blank period P2 provided, only the fourth scan signal GB[i] may be supplied, and the other first, second, and third scan signals GW[i], GC[i], and GI[i] may not be supplied. When the fourth scan signal GB[i] is supplied, the seventh transistor T7 may be turned on such that the voltage of the second initialization power source VINT2 is provided to the anode electrode of the light emitting element LD.

However, the embodiment of the operation of the display device 1000 (see FIG. 1) in the blank period P2 is not limited thereto. For example, as shown in FIG. 5C, a blank period P2' may include a bias period BP' and a second emission period EP2'. While a second emission control signal EM[i] in the bias period BP' is provided, the first scan signal GW[i] may be additionally supplied. Thus, the bias voltage Vbs is additionally supplied to the data line DLj while the second emission control signal EM[i] is provided, and accordingly, a hysteresis characteristic of the first transistor T1 can be further improved in an on-bias state.

Figure 6:
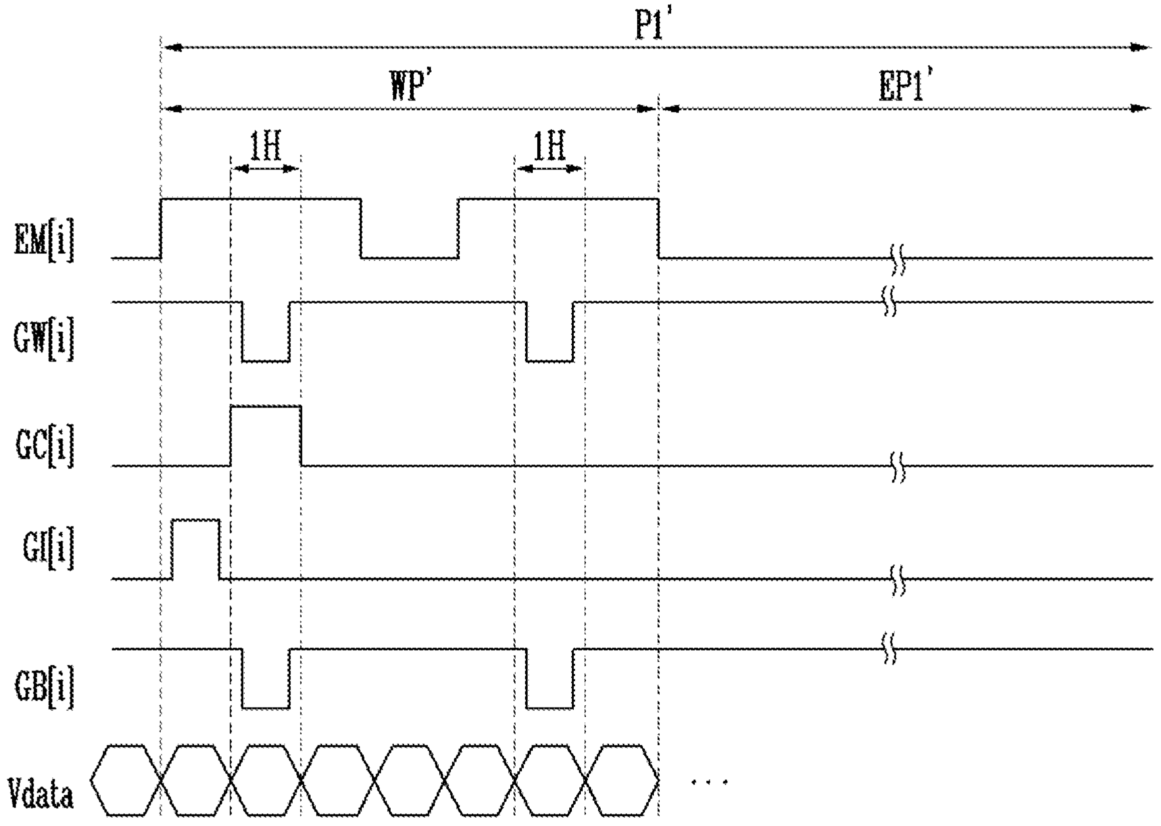
FIG. 6 is a waveform diagram illustrating an embodiment of the operation in the active period of the display device of FIG. 1.

For example, in FIG. 5A, only the fourth scan signal GB[i] is supplied during the period in which the second emission control signal EM[i] is provided. However, in order to improve an on-bias state of the first transistor T1, it is necessary to additionally supply the first scan signal GW[i] to overlap the second emission control signal EM[i] as shown in FIG. 6. However, when the first scan signal GW[i] is supplied to overlap the second emission control signal EM[i], a ghost pattern may occur in a specific area of the display panel 100.

Figure 7:
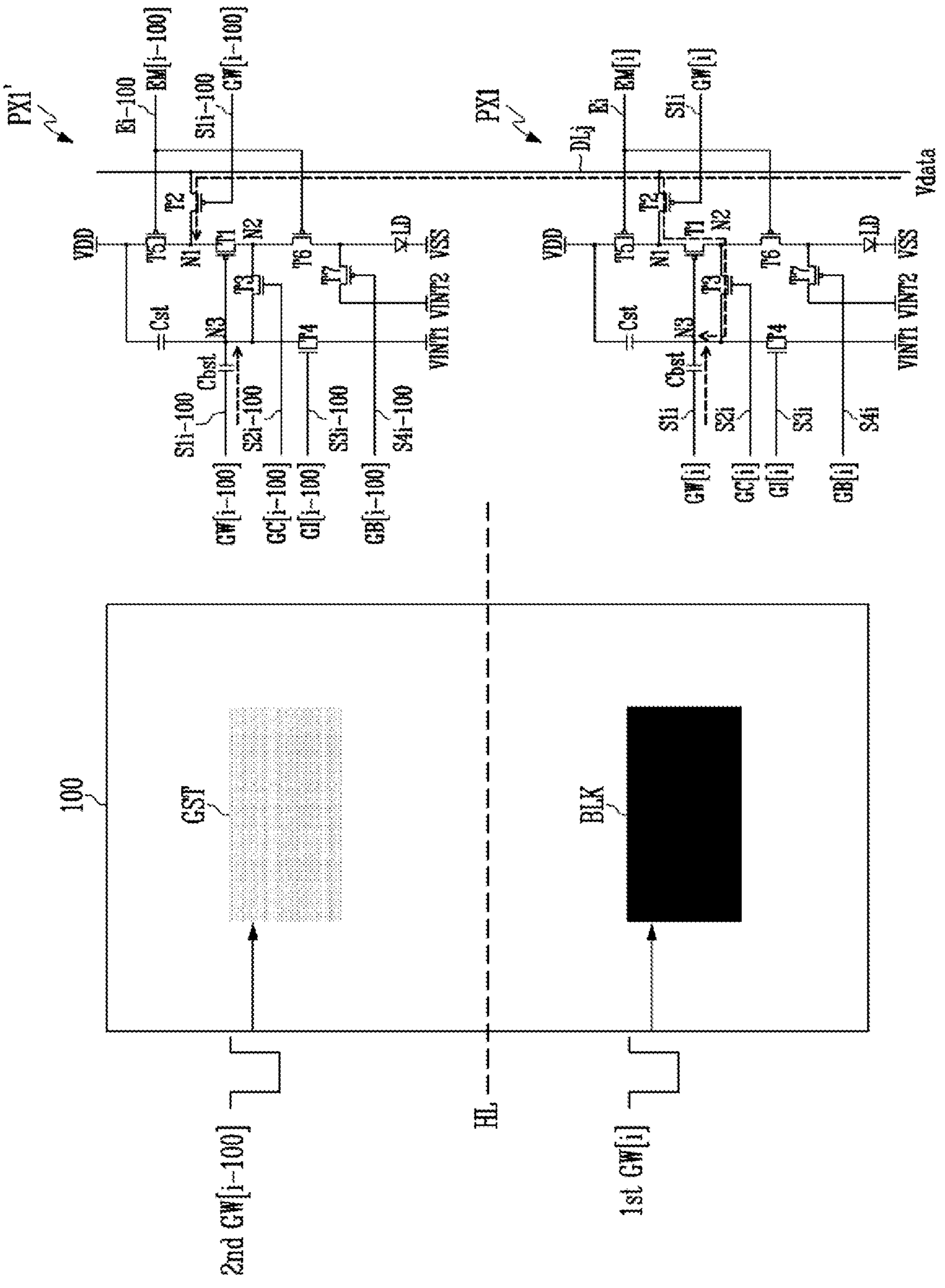
FIG. 7 is a diagram illustrating a ghost phenomenon occurring in a display panel due to the operation of FIG. 6.

FIG. 6 is a waveform diagram illustrating an embodiment of the operation in the active period of the display device shown in FIG. 1. FIG. 7 is a diagram illustrating a ghost phenomenon occurring in the display panel due to the operation shown in FIG. 6.

The embodiment shown in FIG. 6 is different from the embodiment shown in FIG. 5A, in that the first scan signal GW[i] is additionally supplied, while a second emission control signal EM[i] is provided so as to maintain the on-bias state of the first transistor T1 in an active period P1'.

Referring to FIGS. 1, 6, and 7, according to a driving method of the display device 1000, which is shown in FIG. 6, with respect to a virtual middle line HL of the display panel 100 among a plurality of pixels (e.g., a first pixel PX1 and a second pixel PX1') connected to the same data line DLj, a time at which a bias voltage (e.g., the data voltage Vdata) of pixels (e.g., the second pixel PX1') disposed at an upper portion is applied and a time at which the data voltage Vdata is written to pixels (e.g., the first pixel PX1) disposed at a lower portion may overlap each other in the active period P1'. For example, the bias voltage of the second pixel PX1' is set as the data voltage Vdata of the first pixel PX1.

Therefore, a ghost phenomenon may occur, in which a pattern BLK displayed at the lower portion of the display panel 100 is displayed as an afterimage GST. The first pixel PX1 disposed at the lower portion with respect to the middle line HL of the display panel 100 is one of pixels included in the pattern BLK in the form of a black box, and the second pixel PX1' disposed at the upper portion with respect to the middle line HL corresponds to a pixel connected to the same data line DLj as the first pixel PX1 disposed at the lower portion with respect to the middle line HL. For convenience of description, the first pixel PX1 disposed at the lower portion with respect to the middle line HL and the second pixel PX1' disposed at the upper portion with respect to the middle line HL disposed on a pixel row as a $100^{th}$ previous pixel row from that on which the first pixel PX1 is disposed will be described as an example.

Specifically, when a first-first scan signal GW[i] is supplied to the first pixel PX1 disposed at the lower portion with respect to the middle line HL in the active period P1', the second scan signal GC[i] is simultaneously supplied with the first-first scan signal GW[i], and therefore, the first transistor T1 may be connected in the diode form such that the data voltage Vdata having a compensated threshold voltage is applied to the third node N3 of the first pixel PX1 disposed at the lower portion with respect to the middle line HL. In addition, the first scan signal GW[i] having the turn-on level is applied to one electrode of the boosting capacitor Cbst, and therefore, the voltage applied to the third node N3 may be boosted due to the first scan signal GW[i] having the logical low level.

For example, a second-first scan signal GW[i-100] may be supplied to the second pixel PX1' disposed at the upper portion with respect to the middle line HL at the time at which the first-first scan signal GW[i] is supplied to the first pixel PX1 disposed at the lower portion with respect to the middle line HL in the active period P1'. When the second-first scan signal GW[i-100] is supplied, a second scan signal GC[i-100] is not supplied, and therefore, the second pixel PX1' may maintain a data voltage supplied in a previous period. However, the second pixel PX1 may have the on-bias state based on the data voltage Vdata currently supplied to the first node N1 thereof. In addition, a first scan signal GW[i-100] having the turn-on level is applied to the one electrode of the boosting capacitor Cbst, and therefore, the voltage applied to the third node N3 may be boosted due to the first scan signal GW[i-100] having the logical low level.

A high data voltage Vdata is to be applied to the P-type first transistor T1 so as to display the pattern BLK in the form of the black box. Therefore, the high data voltage Vdata may also be provided as a bias voltage to pixels (e.g., the second pixel PX1') connected to the same data line (e.g., DLj) as pixels (e.g., the first pixel PX1) included in the pattern BLK in the form of the black box. When a background screen except the pattern BLK in the form of the black box displayed with a bright color (e.g., white), a data voltage Vdata relatively lower than that for displaying the pattern BLK in the form of the black box may be applied to the other pixels which are not connected to the same data line (e.g., DLj) as the pixels (e.g., the first pixel PX1) included in the pattern BLK in the form of the black box. Therefore, a luminance difference occurs between the pixels (e.g., the second pixel PX1') connected to the same data line (e.g., DLj) as the pixels (e.g., the first pixel PX1) included in the pattern BLK in the form of the black box and the other pixels which are not connected to the same data line (e.g., DLj) as the pixels (e.g., the first pixel PX1) included in the pattern BLK in the form of the black box, and hence a ghost phenomenon may occur, in which the pattern BLK in the form of the black box, which is displayed at the lower portion of the display panel 100 is displayed as an after image at the upper portion of the display panel 100.

Hereinafter, a structure and a driving method of a pixel PX2, which can prevent a ghost phenomenon and maintain the on-bias state of the first transistor T1 in the data writing period WP of the active period P1, will be described in detail with reference to FIGS. 8 and 9.

Figure 8:
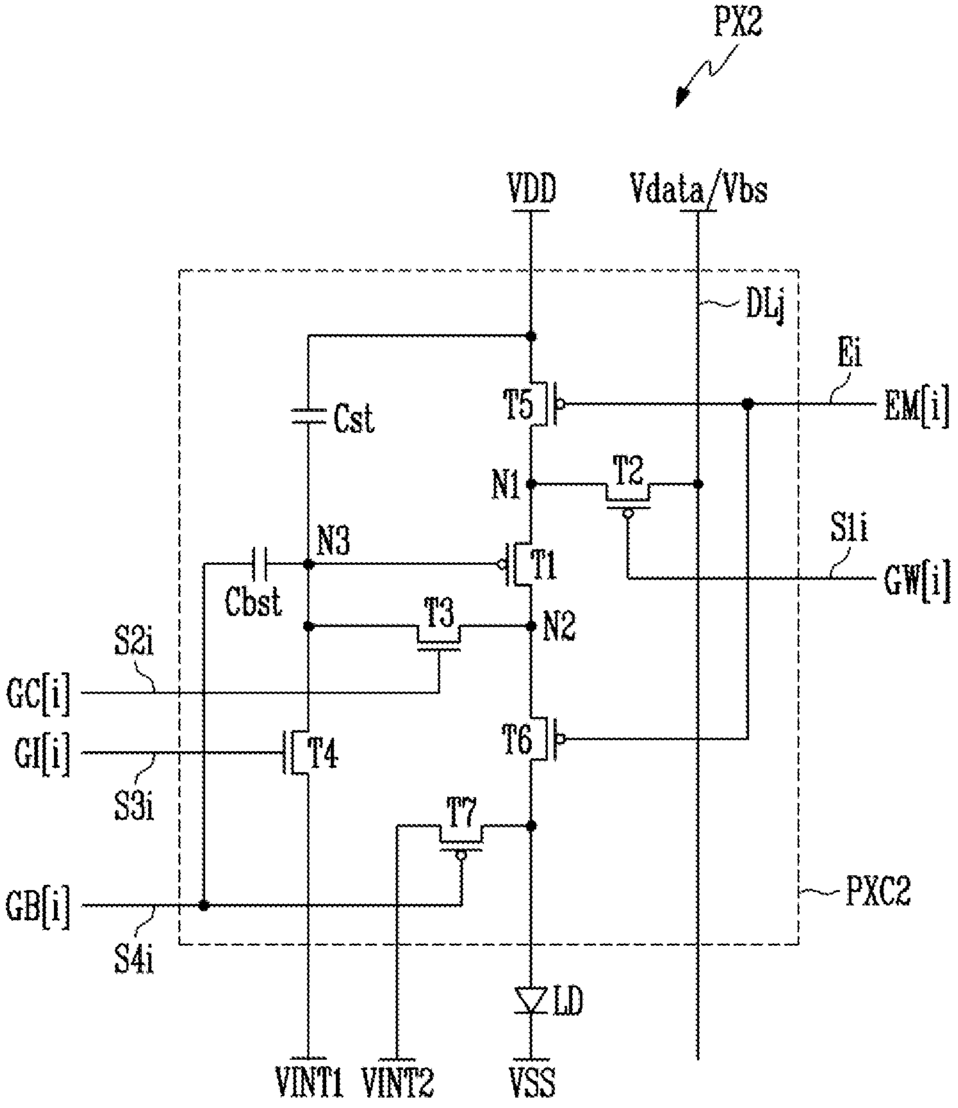
FIG. 8 is a circuit diagram illustrating another embodiment of the pixel included in the display device of FIG. 1, in which a pixel is a pixel disposed on an i-th row and a j-th column, wherein i and j are natural numbers.

FIG. 8 is a circuit diagram illustrating an example of the pixel included in the display device shown in FIG. 1, in which a pixel PX2 is a pixel disposed on an i-th row and a j-th column. Here, i and j are natural numbers.

The pixel PX2 shown in FIG. 8 is different from the pixel PX1 in which the boosting capacitor Cbst shown in FIG. 3 is connected to the first scan line S1i and the third node N3, in that a boosting capacitor Cbst is connected between a fourth scan line S4i and a third node N3. The other components are substantially identical to the embodiment shown in FIG. 3, and therefore, redundant descriptions will be omitted for descriptive convenience. In addition, the pixel PX2 will be described based on the boosting capacitor Cst. The pixel PX2 may operate according to the waveform diagrams shown in FIGS. 5A, 5B, and 5C.

Referring to FIGS. 1, 2, 5A to 5C, and 8, the pixel PX2 may include a light emitting element LD and a pixel circuit PXC2 connected to the light emitting element LD.

An anode electrode of the light emitting element LD may be connected to the pixel circuit PXC2, and a cathode electrode of the light emitting element LD may be connected to the second driving power source VSS. The light emitting element LD may generate light with a predetermined luminance corresponding to an amount of current supplied from the pixel circuit PXC2.

The pixel circuit PXC2 may control an amount of current flowing from the first driving power source VDD to the second driving power source VSS via the light emitting element LD, corresponding to a data voltage Vdata. To this end, the pixel circuit PXC2 may include first to seventh transistors T1 to T7, a storage capacitor Cst, and the boosting capacitor Cbst.

The boosting capacitor Cbst is used to improve a contrast ratio by compensating for a voltage drop due to a load in the display panel 100, and may be connected between the fourth scan line S4i and the third node N3. For example, the boosting capacitor Cbst may boost a voltage of the third node N3 through a capacitive coupling effect, when a voltage level of a fourth scan signal GB[i] supplied through the fourth scan line S4i is changed, particularly, at a time at which the supply of the fourth scan signal GB[i] is suspended, so that the voltage drop due to the load in the display panel 100 can be compensated. Thus, a phenomenon can be reduced, in which the contrast ratio is deteriorated as a gate voltage of the first transistor T1 does not sufficiently increase when a black grayscale is to be expressed.

As shown in FIGS. 5A and 5B, a first scan signal GW[i] may be supplied to a first scan line S1i in the data writing period WP of the active period P1 and the bias period BP of the blank period P2. Therefore, a bias voltage may be supplied to a first electrode of the first transistor T1 in the data writing period WP and the bias period BP. For example, the bias voltage may be periodically applied to the first transistor T1 regardless of the frame frequency. In addition, as shown in FIG. 5C, the first scan signal GW[i] may be supplied, plural times, to the first scan line S1i in the bias period BP' so as to maintain a stable on-bias state. Accordingly, in the low frequency driving operation, the variation of the driving current of the first transistor T1 in the frame period FP can be minimized, and a luminance change of the light emitting element LD in the frame period FP can be minimized.

Hereinafter, scan signals GW[i], GC[i], GI[i], and GB[i] supplied in the active period P1 and an operation of the pixel PX2 will be described in detail with reference to FIGS. 5A and 8. The pixel PX2 may be supplied, plural times, with an emission control signal EM[i] through an emission control line Ei during the data writing period WP. For example, the pixel PX2 may be supplied, twice, with the emission control signal EM[i] having a turn-off level during the data writing period WP and the bias period BP.

In accordance with an embodiment, while a first emission control signal EM[i] in the active period P1 is provided, the first scan signal GW[i], a second scan signal GC[i], and the fourth scan signal GB[i] may be supplied to overlap each other after a third scan signal GI[i] is supplied.

First, when the third scan signal GI[i] is supplied in the active period P1, the fourth transistor T4 may be turned on such that a gate electrode of the first transistor T1 is initialized by the first initialization power source VINT1.

Subsequently, when the first scan signal GW[i] is supplied, the second transistor T2 may be turned on such that the data voltage Vdata from a data line DLj is supplied from the first electrode (e.g., source electrode) of the first transistor T1. The first transistor T1 may have the on-bias state, based on the first initialization power source VINT1 and the data voltage Vdata. For example, at the same time, the fourth scan signal GB[i] having a turn-on level is provided to one electrode of the boosting capacitor Cbst, and therefore, a voltage having a logical low level may be provided such that the on-bias state of the first transistor T1 is boosted or improved.

In addition, the data voltage Vdata may be supplied to the pixel PX2 in synchronization with the first scan signal GW[i] and the second scan signal GC[i], and be stored in the storage capacitor Cst. The pixel PX2 may emit light with a grayscale corresponding to the data voltage Vdata stored in the storage capacitor Cst during the first emission period EP1.

In addition, when the fourth scan signal GB[i] is supplied, the seventh transistor T7 may be turned on such that the voltage of the second initialization power source VINT2 is provided to the anode electrode of the light emitting element LD. Thus, a parasitic capacitance which may occur in the light emitting element LD is discharged, so that the display quality of a black grayscale can be improved.

Subsequently, while a second emission control signal EM[i] in the active period P1 is provided, only the fourth scan signal GB[i] may be supplied, and the other first, second, and third scan signals GW[i], GC[i], and GI[i] may not be supplied.

When the fourth scan signal GB[i] is supplied, the fourth scan signal GB[i] having the turn-on level is provided to the one electrode of the boosting capacitor Cbst, the voltage having the logical low level may be provided to the gate electrode of the first transistor T1 through the capacitive coupling effect. Therefore, the voltage level of the gate electrode of the first transistor T1 decreases, and thus the on-bias state of the first transistor T1 can be boosted or improved.

That is, in the embodiment, the boosting capacitor Cbst is located between the third node N3 and the fourth scan line S4i, and the on-bias state of the first transistor T1 can be boosted by using the fourth scan signal GB[i] supplied, plural times, to the fourth scan line S4i.

In addition, as the boosting capacitor Cbst is located between the third node N3 and the fourth scan line S4i, the first scan signal GW[i] can be supplied only while the first emission control signal EM[i] is provided, and accordingly, the ghost phenomenon can be prevented.

Also, when the fourth scan signal GB[i] is supplied, the seventh transistor T7 may be turned on such that the voltage of the second initialization power source VINT2 is provided to the anode electrode of the light emitting element LD.

For example, as shown in FIG. 5B, in the bias period BP, only the first scan signal GW[i] and the fourth scan signal GB[i] may be supplied, and the second scan signal GC[i] and the third scan signal GI[i] may not be supplied. For example, the second scan signal GC[i] and the c signal GI[i] may have the logical low level.

While a first emission control signal EM[i] in the blank period P2 is provided, a bias voltage Vbs may be supplied to the data line DLj. The voltage level of the bias voltage Vbs may be determined to maintain an on-bias state of the first transistor T1. For example, when the first scan signal GW[i] is supplied, the bias voltage Vbs may be supplied to the source electrode of the first transistor T1 (i.e., a first node N1). For example, the bias voltage Vbs may be a voltage corresponding to the black grayscale.

In addition, when the fourth scan signal GB[i] is supplied simultaneously with the first scan signal GW[i], the fourth scan signal GB[i] having the turn-on level is provided to the one electrode of the boosting capacitor Cbst, and therefore, the voltage having the logical low level may be provided to the gate electrode of the first transistor T1 due to capacitive coupling. Thus, the voltage level of the gate electrode of the first transistor T1 decreases, and hence the on-bias state of the first transistor T1 can be boosted or improved.

In addition, when the fourth scan signal GB[i] is supplied, the seventh transistor T7 may be turned on such that the voltage of the second initialization power source VINT2 is provided to the anode electrode of the light emitting element LD. Thus, a parasitic capacitance which may occur in the light emitting element LD is discharged, so that the display quality of a black grayscale can be improved.

Subsequently, while a second emission control signal EM[i] in the blank period P2 is provided, only the fourth scan signal GB[i] may be provided, and the other first, second, and third scan signals GW[i], GC[i], and GI[i] may not be supplied.

When the fourth scan signal GB[i] is supplied, the fourth scan signal GB[i] having the turn-on level is provided to the one electrode of the boosting capacitor Cbst, and therefore, the voltage having the logical low level may be provided to the gate electrode of the first transistor T1 due to capacitive coupling. Thus, the voltage level of the gate electrode of the first transistor T1 decreases, and hence the on-bias state of the first transistor T1 can be boosted or improved. For example, the on-bias state of the first transistor T1 is boosted not by providing a bias voltage (e.g., the bias voltage Vbs) to the first electrode (e.g., source electrode) of the first transistor T1 but by providing the fourth scan signal GB[i] having the logical low level to the gate electrode of the first transistor T1. Thus, the on-bias state of the first transistor T1 can be maintained when a first-first scan signal GW[i] is applied.

Also, when the fourth scan signal GB[i] is supplied, the seventh transistor T7 may be turned on such that the voltage of the second initialization power source VINT2 is provided to the anode electrode of the light emitting element LD.

However, the embodiment of the operation of the display device 1000 (see FIG. 1) in the blank period P2 is not limited thereto. For example, as shown in FIG. 5C, while a second emission control signal EM[i] in the blank period P2' is provided, the first scan signal GW[i] may be additionally supplied. Thus, the bias voltage Vbs is additionally supplied to the data line DLj while the second emission control signal EM[i] is provided, and accordingly, a hysteresis characteristic of the first transistor T1 can be further improved in an on-bias state.

Figure 9:
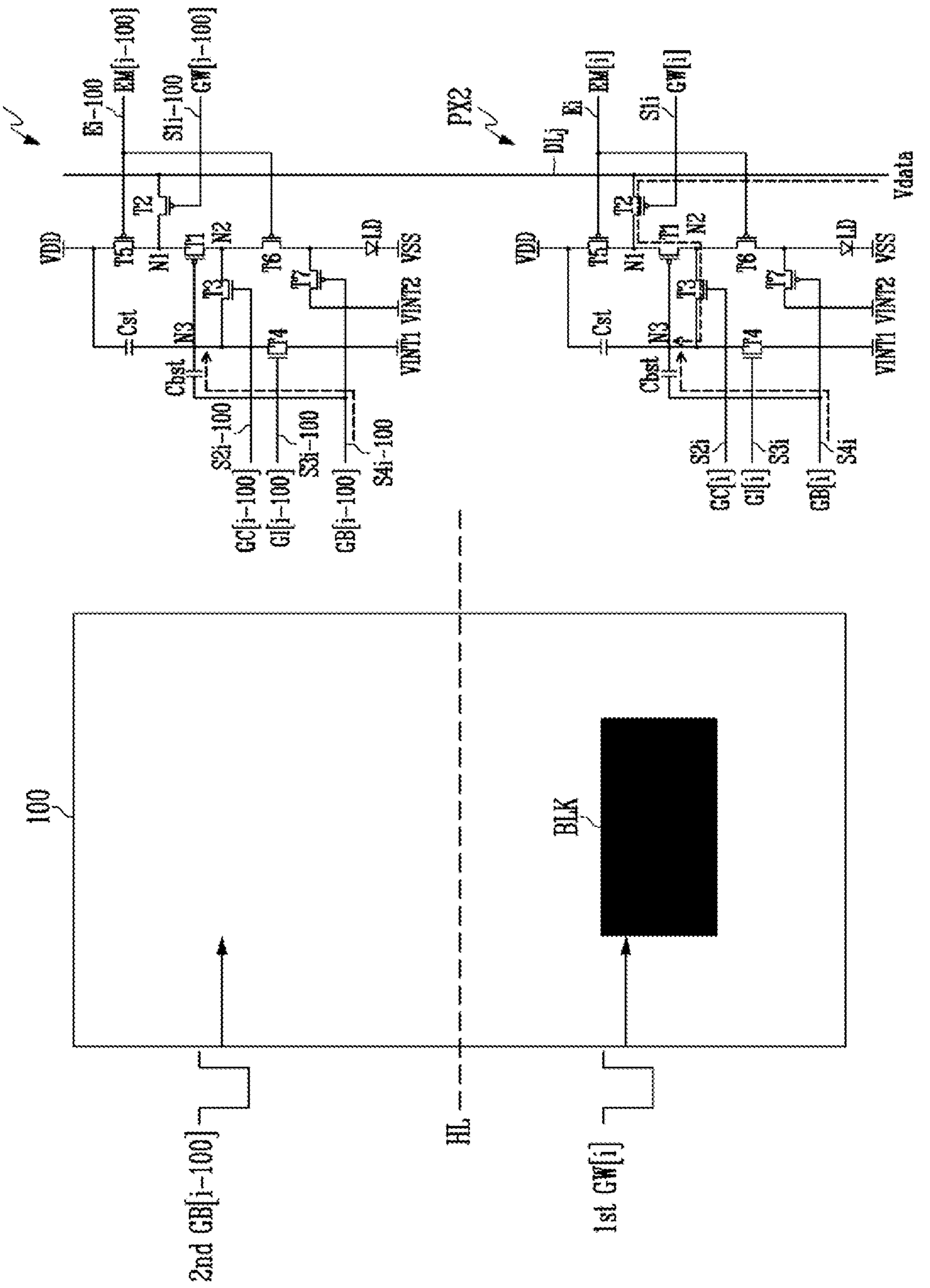
FIG. 9 is a diagram illustrating an effect of preventing a ghost phenomenon occurring in the pixel of FIG. 8.

FIG. 9 is a diagram illustrating an effect of preventing a ghost phenomenon occurring in the pixel shown in FIG. 8.

Referring FIGS. 5A, 8, and 9, according to a driving method of the pixel PX2 shown in FIG. 8, with respect to a virtual middle line HL of the display panel 100 among a plurality of pixels (e.g., a first pixel PX2 and a second pixel PX2') connected to the same data line DLj, a time at which a second fourth scan signal GB[i-100] is applied to pixels (e.g., the second pixel PX2') disposed at an upper portion and a time at which the data voltage Vdata is written to pixels (e.g., the first pixel PX2) disposed at a lower portion may overlap each other in the active period P1. The first pixel PX2 disposed at the lower portion with respect to the middle line HL of the display panel 100 is one of pixels included in a pattern BLK in the form of a black box, and the second pixel PX2' corresponds to a pixel connected to the same data line DLj as the first pixel Px2 disposed at the lower portion with respect to the middle line HL. For convenience of description, the first pixel PX2 disposed at the lower portion with respect to the middle line HL and the second pixel PX2' disposed at the upper portion with respect to the middle line HL disposed on a pixel row as a $100^{th}$ previous pixel row from that on which the first pixel PX2 is disposed will be described as an example.

Specifically, when a first-first scan signal GW[i] is supplied to the first pixel PX2 disposed at the lower portion with respect to the middle line HL in the active period P1, the second scan signal GC[i] is simultaneously supplied with the first-first scan signal GW[i], and therefore, the first transistor T1 may be connected in the diode form such that the data voltage Vdata having a compensated threshold voltage is applied to the third node N3 of the first pixel PX2 disposed at the lower portion with respect to the middle line HL. In addition, the fourth scan signal GB[i] having the turn-on level is applied to one electrode of the boosting capacitor Cbst, and therefore, the voltage applied to the third node N3 may be boosted due to the fourth scan signal GB[i] having the logical low level.

For example, a second fourth scan signal GBW[i-100] may be supplied to the second pixel PX2' disposed at the upper portion with respect to the middle line HL at the time at which the first-first scan signal GW[i] is supplied to the first pixel PX2 disposed at the lower portion with respect to the middle line HL in the active period P1. When the second fourth scan signal GB[i-100] is supplied, the first scan signal GW[i] is not supplied. Therefore, the data voltage Vdata is not applied to the second pixel PX2', but the fourth scan signal GB[i-100] having the turn-on level is applied to the one electrode of the boosting capacitor Cbst, and hence the voltage applied to the third node N3 may be boosted due to the fourth scan signal GB[i-100] having the logical low level.

As described above, the data voltage Vdata is not provided to pixels (e.g., the second pixel PX2') connected to the same data line (e.g., DLj) as the pixels (e.g., the first pixel PX2) included in the pattern BLK in the form of the black box, and thus the ghost phenomenon described above in FIG. 7 does not occur in the pixels (e.g., the second pixel PX2') disposed at the upper portion with respect to the middle line HL.

Further, the fourth scan signal GB[i] having the turn-on level is provided to the one electrode of the boosting capacitor Cbst, and hence the voltage having the logical low level may be provided to the gate electrode of the first transistor T1 through the capacitive coupling effect. Therefore, the voltage level of the gate electrode of the first transistor T1 decreases, and thus the on-bias state of the first transistor T1 can be boosted or improved. That is, the on-bias state of the first transistor T1 is boosted not by providing a bias voltage (e.g., the bias voltage Vbs) to the first electrode (e.g., source electrode) of the first transistor T1 but by providing the fourth scan signal GB[i] having the logical low level to the gate electrode of the first transistor T1. Thus, the on-bias state of the first transistor T1 can be maintained when a first-first scan signal GW[i] is applied.

In the display device in accordance with the present disclosure, any ghost phenomenon does not occur when a bias voltage is applied to a driving transistor is applied, thereby improving display quality.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A pixel comprising:
- a light emitting element;
- a first node connected to a first driving power source;
- a second node connected to an anode electrode of the light emitting element;
- a first transistor connected between the first node and the second node and having a gate electrode connected to a third node;
- a second transistor connected between a data line and the first node, the second transistor to be turned on by a first scan signal applied through and having a gate electrode connected to a first scan line;
- a third transistor connected between the second node and the third node, the third transistor to be turned on by a second scan signal applied through and having a gate electrode connected to a second scan line;
- a fourth transistor connected between the third node and a first initialization power source, the fourth transistor to be turned on by a third scan signal applied through and having a gate electrode connected to a third scan line;
- a first capacitor connected between the first driving power source and the third node; and
- a second capacitor connected between having an input electrode and an output electrode, and connected to the third node through the output electrode to boost a voltage of the gate electrode of the first transistor in response to change in a voltage of the input electrode.

2. The pixel of claim 1, wherein the second capacitor is configured to control a voltage of the gate electrode of the first transistor in response to change in a voltage of the input electrode.

3. The pixel of claim 1, wherein the first transistor and the third transistor comprise different types of thin film transistors from each other.

4. The pixel of claim 1, wherein the first transistor comprises a P-type thin film transistor, and the third transistor comprises a N-type thin film transistor.

5. The pixel of claim 1, wherein each of the third and fourth transistors comprises an oxide semiconductor thin film transistor.

6. The pixel of claim 1, wherein the input electrode is connected to the first scan line.

7. The pixel of claim 1, further comprising a fifth transistor connected between a second initialization power source and the anode electrode of the light emitting element and having a gate electrode connected to a fourth scan line.

8. The pixel of claim 7, wherein the input electrode is connected to the fourth scan line.

9. The pixel of claim 7, wherein:
- the first to fourth scan lines are configured to transmit first to fourth scan signals, respectively;
- the pixel is driven in units of a frame period;
- the frame period comprises an active period and at least one black period; and
- the second and third scan signals are supplied in the active period, and the second and third scan signals are not supplied in the blank period.

10. The pixel of claim 9, wherein the first scan signal is supplied in each of the active period and the blank period.

11. The pixel of claim 10, wherein the second scan signal overlaps the first scan signal in the active period.

12. The pixel of claim 10, wherein the fourth scan signal is supplied in the active period, the fourth scan signal overlapping the first scan signal in the active period.

13. The pixel of claim 10, wherein the fourth scan signal is supplied in the blank period, the fourth scan signal overlapping the first scan signal in the blank period.

14. The pixel of claim 7, further comprising:

a sixth transistor connected between the first driving power source and the first node; and a seventh transistor connected between the second node and the anode electrode of the light emitting element, wherein the sixth and seventh transistors have gate electrodes connected to at least one emission control line.

15. The pixel of claim 14, wherein each of the first, second, fifth, sixth, and seventh transistors is a P-type Low Temperature Poly-Silicon (LTPS) thin film transistor, and each of the third and fourth transistors is an N-type oxide semiconductor thin film transistor.

* * * * *